Dec. 28, 1948.  G. H. NORQUIST  2,457,263
SOLDERING STAND ASSEMBLY
Filed June 23, 1945  3 Sheets-Sheet 1
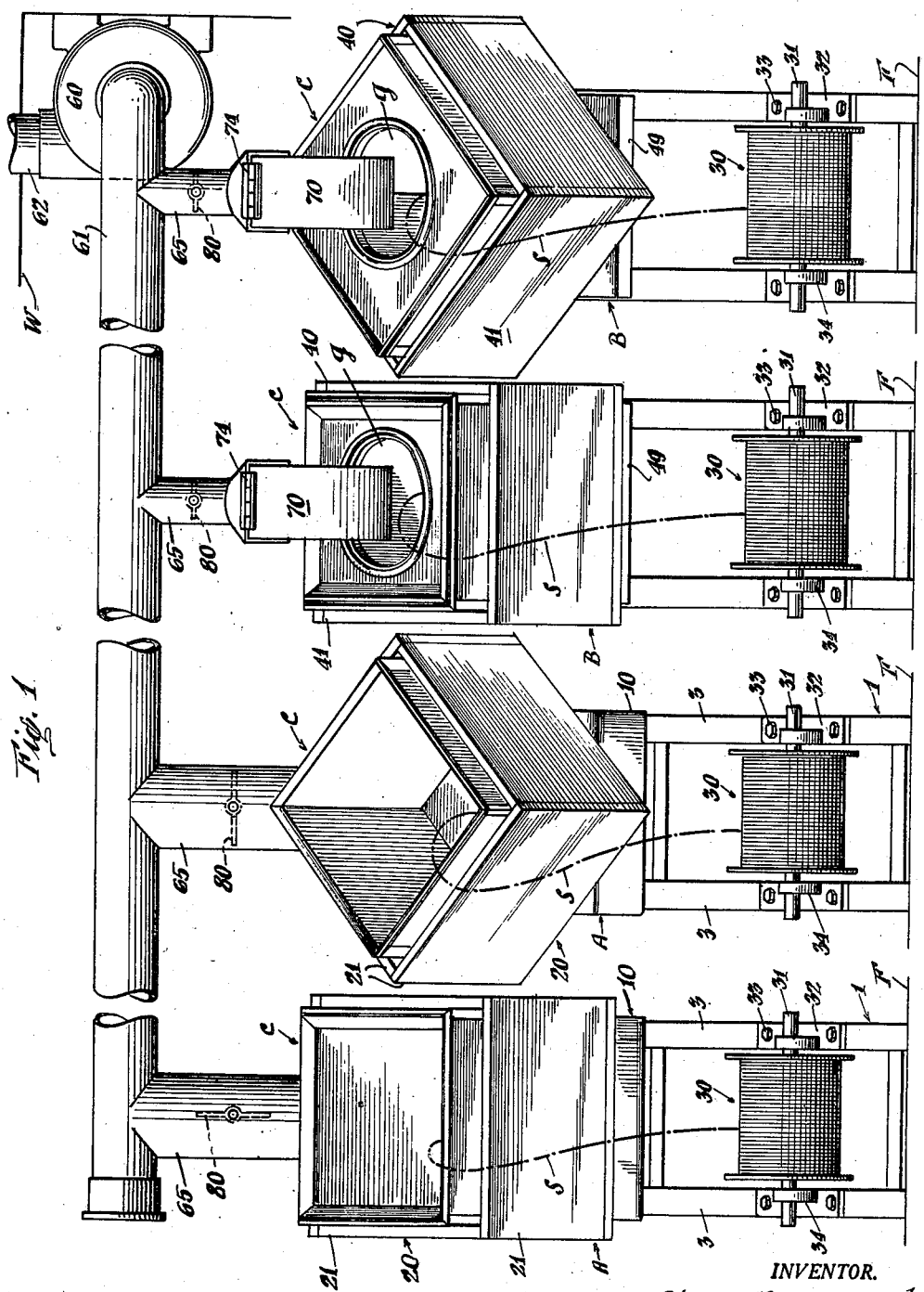
INVENTOR.
Glenn H. Norquist
BY
Austin, Wilhelm & Carlson
ATTORNEYS Dec. 28, 1948.　　　　G. H. NORQUIST　　　　2,457,263
SOLDERING STAND ASSEMBLY
Filed June 23, 1945　　　　　　　　　　　3 Sheets-Sheet 2
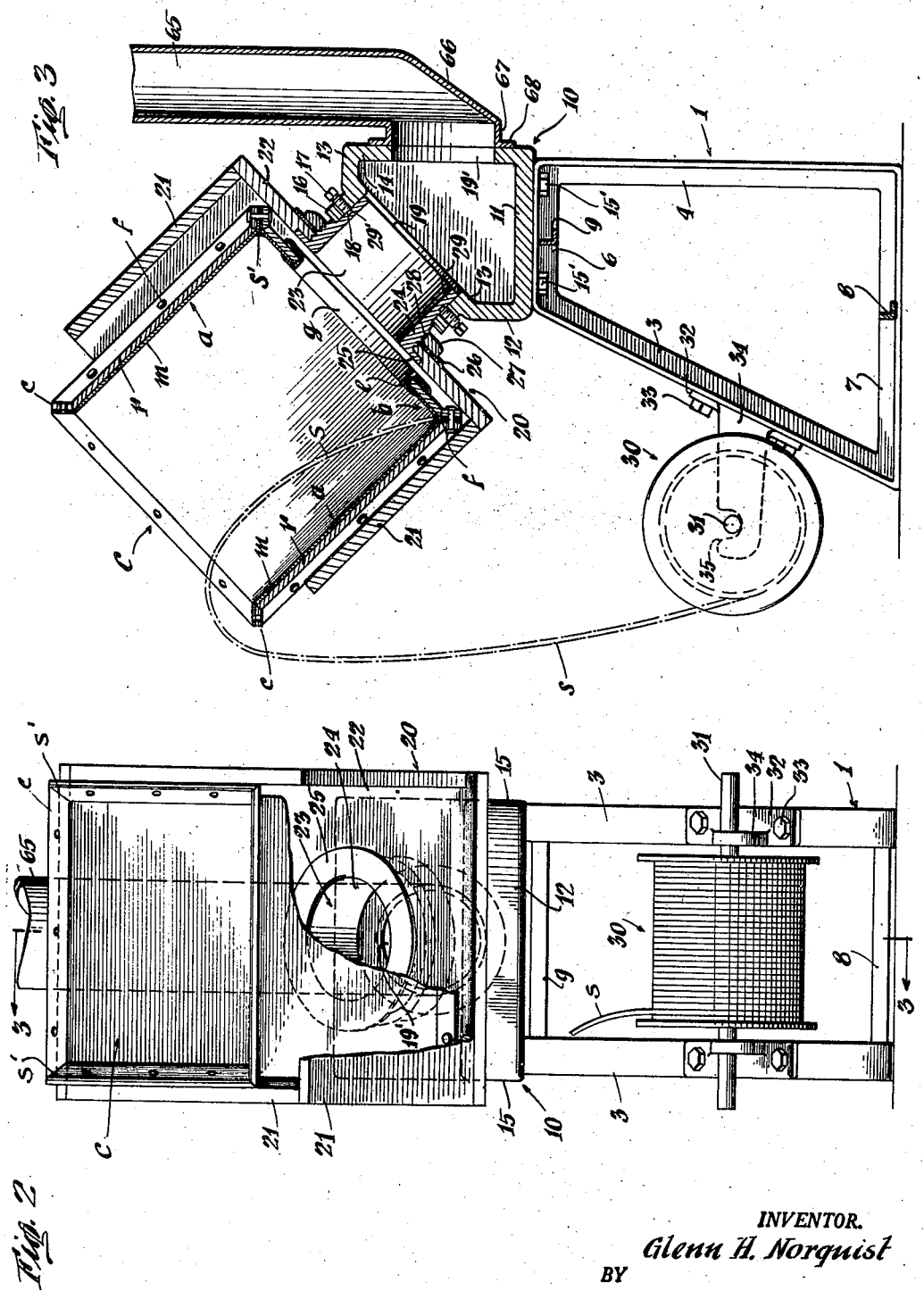
INVENTOR.
Glenn H. Norquist
BY
Austin, Wilhelm + Carlson
ATTORNEYS Dec. 28, 1948.　　　G. H. NORQUIST　　　2,457,263
SOLDERING STAND ASSEMBLY
Filed June 23, 1945　　　3 Sheets-Sheet 3
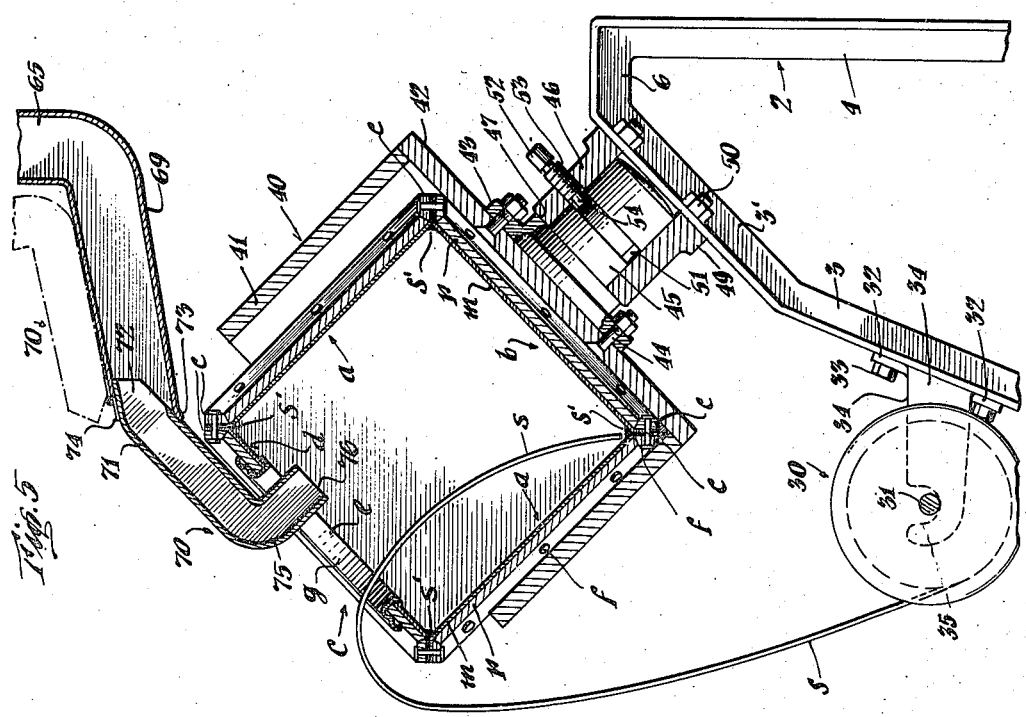
INVENTOR.
Glenn H. Norquist
BY
Austin, Wilhelm & Carlson
ATTORNEYS Patented Dec. 28, 1948

2,457,263

UNITED STATES PATENT OFFICE 2,457,263

SOLDERING STAND ASSEMBLY

Glenn H. Norquist, Jamestown, N. Y.

Application June 23, 1945, Serial No. 601,212

3 Claims. (Cl. 113—111)

This invention relates to a soldering stand assembly comprising one or more supporting stands upon which work pieces to be soldered may be supported and shifted into various convenient working positions and having means associated therewith for drawing off and eliminating obnoxious fumes resulting from the soldering operations.

Soldering operations are commonly performed by a workman with the use of a soldering iron which is held in one hand and a solder stick or wire which is held in the other hand. The end of the soldering wire is hand-guided over the area to be soldered and melted by the heated head of the soldering iron, the head being so shaped as to spread the melted solder over the working area and trowel the surface of the solder in place.

Since both hands of the workman are thus occupied, the work piece should be conveniently positioned and located to best expose the areas to be soldered.

Metal parts to be soldered are often cumbersome in shape and of substantial weight, and the areas to be soldered often difficult of access, thus making particularly important the design and construction of the soldering stand assembly at which the workman may work at maximum speed with a minimum of tiring effort.

The soldering operation also produces obnoxious fumes which are detrimental to the workman's health and greatly impairs his working efficiency, unless promptly eliminated. Preparatory to soldering, certain acids are applied to the metal surface to cleanse the areas to be soldered and insure a firm bond between the solder and the adjacent metal areas of the work piece. When the molten solder contacts the acid coating, acidic fumes are given off which should be promptly drawn off and eliminated as formed if maximum production is to be achieved.

This invention is directed to the provision of an improved and highly convenient soldering stand assembly designed to support and manipulate the work pieces, such as metal lined containers and boxes whose inner corners and corner edges are to receive solder. Each stand is provided with a holding frame within which the work piece to be operated upon may be conveniently placed. The container holding frame is supported at a convenient elevation above the workshop floor and is rotatably mounted at a convenient inclined angle so as to permit rotation of the holding frame and work piece supported therein so that the areas to be soldered may be swung into the most convenient and accessible position for application of the solder with a minimum of tiring strain on the operator.

The stand is also provided with means for mounting the spool of soldering wire in a convenient location adjacent the work piece holding frame so that the end of the soldering wire can be applied by the workman to the area to be soldered with the avoidance of entangling or inconvenient lengths of soldering wire being withdrawn from the spool. The stand is so constructed that no associated parts thereof project in the way to the inconvenience of the workman. The workman may occupy a comfortable standing or sitting position adjacent the work supporting stand with all working areas of the work piece conveniently accessible.

Means associated with the stand is also provided for withdrawing and eliminating all obnoxious fumes resulting from the soldering operation. In one form of the invention the fumes are withdrawn from the workpiece through an opening provided in the bottom of the work piece holding frame, which communicates with a collar thereto attached. The holding frame collar has a snug but rotating fit with a stationary collar forming a part of an exhaust box supported upon the stand framework. The exhaust box communicates with an exhaust conduit which in turn communicates with an exhaust fan which expels the obnoxious fumes from the workroom. By this arrangement all fumes which can escape through the bottom of the holding frame are eliminated. In event the work piece is such that fumes cannot be withdrawn from the bottom of the holding frame, a movable exhaust spout is provided which is mounted adjacent to the top of the holding frame. The upper end of this spout is hingedly connected to a fixed exhaust pipe connected to the exhaust fan system so that the spout can be conveniently swung out of the way when the workpiece is to be placed within or to be removed from the holding frame. The lower end of this movable spout is shaped so that it may be conveniently swung into the work piece to withdraw fumes therefrom with the least possible obstruction to the arms and hands of the workman and the soldering tool and soldering wire which his hands employ.

In mass production operations it is convenient to employ two types of stands. One type of stand is equipped with a bottom exhaust where the workman performs the soldering operations which give rise to fumes which can be exhausted through the bottom of the holding frame. The other type of stand is equipped with an upper exhaust spout for exhausting the obnoxious fumes which can only be withdrawn from the upper end of the work piece. It will be appreciated however that the stand having the bottom fume exhaust may, if desired, be also equipped with an upper fume exhaust, so that all the soldering operations may be performed at one type of stand.

An object of this invention is to provide improved soldering stand assembly whereby difficult soldering operations may be conveniently and rapidly performed with a minimum of tiring effort on the workman and with the assurance that unhealthful and annoying fumes resulting from the soldering operation are promptly eliminated.

Another object of this invention is to provide an improved soldering stand assembly constructed to permit retention of the work piece in the most convenient location during the soldering operation and which permits shifting movement of the work piece to place the areas to be soldered in the most convenient and accessible position.

Another object of this invention is to provide a soldering stand assembly comprising a rotatable work piece holding frame designed to retain and support the work piece at a convenient elevation and in various inclined positions to render conveniently accessible to the workman the various areas of the work piece to be soldered, means being associated with the stand for withdrawing and eliminating from the confines of the frame all obnoxious fumes immediately as generated by the soldering operation.

Other objects and advantages of this invention will become apparent as the disclosure proceeds.

Although the characteristic features of this invention will be particularly pointed out in the claims appended hereto, the invention itself and the manner in which it may be carried out, may be better understood by referring to the following description taken in connection with the accompanying drawings forming a part hereof, in which Fig. 1 is a diagrammatic elevational view of the improved soldering stand assembly illustrating an arrangement of a plurality of soldering stands with a fume exhaust system associated therewith.

Fig. 2 is a front elevational view of one form of stand having means to withdraw the soldering fumes through the bottom of the work piece holding frame.

Fig. 3 is a vertical cross-sectional view of the stand shown in Fig. 2 as the same appears when viewed along line 3—3 of Fig. 2.

Fig. 4 is a front elevational view of a soldering stand equipped with means for exhausting the soldering fumes through the upper end of the work piece supported within the holding frame of the stand; and Fig. 5 is a vertical cross sectional view through the stand shown in Fig. 4 as the same appears when viewed along 5—5 of Fig. 4.

Similar reference characters refer to similar parts throughout the several views of the drawings and specification.

There is shown in Fig. 1 a complete soldering stand assembly arranged in a production line row, all stands being connected to a common fume exhaust system. Each stand comprises a complete and convenient work bench for the soldering workman who may perform the same or different soldering operations on successive work pieces. Soldering stands A are each equipped with means for withdrawing the soldering fumes through the bottom of the work piece holding frame, while the stands B are equipped with means for withdrawing the soldering fumes through the upper end of the holding frame, or through the upper end of the work piece supported in the holding frame.

Referring more particularly to the soldering stand A illustrated in detail in Figs. 2 and 3, it will be noted that this stand comprises a structural supporting framework 1 which supports an exhaust box 10 and a holding frame 20 for the work piece C. The work piece holding frame 20 is rotatably supported at a convenient elevation and in inclined position upon the exhaust box 10 in a manner so that soldering fumes can be withdrawn through the bottom of the holding frame 20 and into the exhaust box 10 for disposal through the exhaust system.

The structural support 1 may be formed of sturdy metal or wood members and comprises a pair of spaced upwardly extending, rearwardly inclined legs 3 each joined to a corresponding vertical extending leg 4 by an upper connecting frame member 6 and a lower connecting frame member 7. Suitable strut bars 8 and 9 may be provided for sturdily connecting the spaced bottom frame members 8 and the spaced upper frame members 9, thereby providing a strong and sturdy structure for supporting the exhaust box 10, the holding frame 20, and the various connecting devices associated therewith.

The exhaust box 10 may be built up or formed from metal sheet or plate comprising a bottom wall 11, a relatively low vertical extending front wall section 12 connected to a vertically inclined front wall section 13, a rear wall 14 connecting the upper end of the vertically inclined front wall section 13 to the bottom wall 11, and end walls 15 for closing the ends of the exhaust box. The exhaust box may be rigidly secured to the spaced horizontal extending upper frame members 6 of the structural support 1 as by bolts 15'.

The holding frame 20 may be shaped in the form of a box comprising enclosing side walls 21 secured to a bottom wall 22. It will be appreciated that the shape and size of the holding frame 20 should be such as to most conveniently support and retain the work piece C to be soldered. The holding frame is to be supported at such an inclined angle as to support the work piece C in the most convenient and accessible position for the workman who is to perform the soldering operation. The bottom wall 22 of the holding frame is provided with an opening 23 therein through which the soldering fumes may be withdrawn from the soldering area during the soldering operation.

The holding frame 20 is rotatably supported on the exhaust box 10 by means of a tubular collar 24 having a flared flange 25 at the upper end thereof which seats within a corresponding circular receiving groove formed on the inside face of the bottom wall 22 of the holding frame and extending around the exhaust opening 23. The bottom wall 22 is firmly clamped to the collar 24 by means of a metal ring internally threaded to cooperate with threads 28 extending around the external periphery of the collar 24. A sealing gasket 26 may be positioned between the threaded ring 27 and the outside face of the bottom wall 22 so as to effectuate a tight fit when the threaded ring 27 is manipulated to clamp the bottom wall between the collar flange 25 and the threaded ring 27.

The collar 24, thus firmly attached to the bottom wall 22, is provided with a body section 29 which has a tubular shape designed to snugly fit and rotate within a raised collar section 16 which surrounds the fume opening 19 provided in the inclined front wall section 13 of the exhaust box 10. To prevent undesired withdrawal of the body section 29 of the collar 24 from the raised collar section 16, one or more threaded holding screws 17 may be provided which extend into corresponding threaded openings in the collar section 16. Each set screw 17 has a smooth and rounded end 18 which extends into and tracks within a correspondingly shaped circumferential extending groove 29' provided in the outer surface of the collar body section 29. The collar 24, and the holding frame 20 to which it is attached, may be rotated as desired on the raised collar section 16 of exhaust box 10, the set screws 17 preventing withdrawal of the collar 24 from the collar section 16. Thus it will be appreciated that the holding frame 20 may be rotated into any desired position to best expose the desired areas of the work piece C for the application of solder by the workman.

It will also be noted that any particular holding frame 20 may be removed by first manipulating the set screws 17 to permit withdrawal of the collar 24 from the collar section 16 of the exhaust box 10 and thereafter manipulating the threaded ring 27 so as to remove the same from the collar 24, permitting detachment of the collar 24 from the bottom wall 22 of the holding frame. In event workpieces having a different size or shape are to be soldered, another holding frame may be provided, shaped to most conveniently hold and accommodate such work pieces, which holding frame can then be attached to the collar 24, and the collar 24 in turn applied and rotatably secured to the collar section 16 of exhaust box 10 as above indicated. Thus it will be appreciated that this invention provides for complete interchangeability of holding frames best designed to retain and accommodate the work pieces.

The obnoxious soldering fumes may be continuously withdrawn from the exhaust box 10 by means of an exhaust fan 60 positioned in any convenient location in the workroom. The exhaust box 10 is connected by a branch conduit 65 to the main exhaust line 61 which leads to the exhaust fan 60. The branch conduit 65 is provided with an elbow 66 at the lower end thereof joined to a collar 67 having a flared flange 68 secured to the rear wall 14 of the exhaust box 10. The rear wall 14 of the exhaust box 10 is provided with an exhaust opening 19' through which the fumes entering into the exhaust box 10 are withdrawn through the elbow 66 and branch conduit 65. The discharge outlet 62 of the exhaust fan 60 is connected to a suitable elimination conduit 62 which may extend through the wall W of the workroom so as to discharge the undesirable fumes from the workroom.

The spool 30 of soldering wire s may be conveniently mounted upon a shaft 31, the ends of which are mounted upon a pair of brackets secured to and extending laterally from the front inclined legs 3 of the supporting structure 1. Each of these brackets may comprise a base plate 32 secured as by bolts 33 to the adjacent leg 3. A supporting arm 34 is fixed to and extends laterally from each of the base plates 32. Each of the arms 34 is provided with a suitable socket or opening 35 to receive and retain the adjacent end of the spool shaft 31. The spool 30 is thus conveniently located entirely out of the way of the workman applying the solder to the work piece C while standing or sitting in front of the stand. It will also be noted that soldering wire s can be withdrawn from the spool for operating purposes in convenient short lengths without obstructive interference to the workman or to the soldering work being done.

There is illustrated in Figs. 4 and 5 a slightly modified form of soldering stand which may be employed where the fumes are to be withdrawn from the upper end of the work piece C. This modified soldering stand, designated B for convenience, comprises a supporting framework 2 which includes a pair of spaced inclined front frame members 3 each having an upper section 3' which is further inclined and joined to the rear vertical extending leg 4 by a top horizontal connecting frame section 6. The supporting framework 2 as shown in Figs. 4 and 5 may be otherwise substantially similar in construction to the supporting framework 1 shown in Figs. 2 and 3.

The holding frame 40 supporting and retaining the work piece C may be provided with enclosing side walls 41 secured to a solid bottom wall 42 mounted at an inclined angle most conveniently to expose to the workman the areas of the work piece to be soldered. The bottom wall 42 of the holding frame 40 is fixed to a supporting plate 43 as by bolts 44. A stud shaft 45 projects from the plate 43 and is designed to rotatably fit within a tubular collar 46, which is open at the upper end thereof and secured to a supporting base 49 at the lower end thereof. The supporting base 49 is secured as by bolts 50 to the spaced incline sections 3' of the front legs 3. The frame plate 43 is provided with a shoulder formation 47 which seats on the upper end of the tubular collar 46 so as to freely rotate thereon. The stud 45 may be provided with a circumferentially extending groove 51 into which the rounded end 54 of one or more holding screws 52 may track. Each holding screw 52 is provided with a threaded body 53 which threads into a threaded opening in the tubular collar 46. Thus it will be appreciated that the stud 45 is free to rotate within the tubular collar 46, but withdrawal thereof is prevented by the set screws 52. This mounting permits the holding frame 40 and the work piece C supported therein to be freely rotated in various convenient positions. The holding frame 40 may be removed and replaced by a holding frame of different size and shape by the attaching bolts 44.

As shown more particularly in Figs. 4 and 5, the suction system associated with soldering stand B comprises a laterally extending conduit 69 connected as by an elbow to the adjacent branch conduit 65 of the exhaust system. A conduit section 70, having a body portion 71 of a relatively flat rectangular cross sectional shape, has one end 72 thereof tapered and shaped to fit within the flared end of the fixed laterally extending conduit 69. When in operating position, the conduit section is rested upon and is supported by the lower edge 73 of the flared end laterally extending conduit section 69. The top wall of the conduit section 70 is connected as by a hinge 74 to the fixed conduit 69 so that the hinging section 70 may be swung into the position shown in dotted lines in Fig. 5. One end of the body portion 71 is joined to an angularly extending nozzle portion 75 which is shaped and formed to extend into the work piece C to be soldered with minimum of interference to the workman. The fumes generated during the soldering operation enter the open end 76 of the hinged conduit section 70 and is drawn into the fixed laterally extending conduit 69, through the branch conduit 65, and into the main exhaust conduit 61 to be drawn off by the exhaust fan 60. The hinging section 70 is thus adapted to swing into and out of operating position and is within easy reach of the workman while standing or sitting before the work piece supporting stand.

As shown in Fig. 1, a plurality of stands A and B may be conveniently arranged on the workshop floor F in a manner so that all stands may be connected to a common exhaust system. Suitable control valves 80 may be provided in the branch conduits 65 so as to close off such branch conduits as are not in use. It will also be appreciated that the stand A shown in Figs. 2 and 3 may also be provided with a lateral extending conduit 69 connected into the branch line 65 which draws off the fumes through the bottom of its holding frame 20. It will be thus appreciated that an overhead suction system for drawing fumes from the top of the work piece C may also be employed with the stand A as shown in Figs. 2 and 3, suitable control valves being provided if desired so that either the lower or the overhead suction system may be used simultaneously or alternatively.

This improved soldering stand assembly has been successfully and extensively employed for the soldering of the interior corner edges and corners of metal lined plywood containers of the type graphically illustrated in the drawings. These containers comprise enclosing side wall panels a, a bottom wall panel b, and a top wall panel d, the top wall panel d having a filling opening g therein, the opening being encased in a circumferential extending metal rim e. Each of these panels is formed of metal clad plywood comprising a plywood base sheet p having a metal liner sheet m bonded to the surface of the plywood base sheet. Each panel is provided with outwardly flared flanges c, adjacent paired flanges of the container forming panels being secured together by metal eyelets f, with the adjacent metal faces of the flanges in surface contact.

The soldering stand assembly as herein described has been successfully and extensively used in the application of seams of solder s' to the inner corner edges and corners of these containers. In the assembly of such containers, the adjacent paired flanges c and the enclosing side wall panels a are first secured together in firm assembly by the rivets or eyelets f. The top wall panel d is then applied, with the flanges c of the top wall panel d secured as by the rivets or eyelets f to the adjacent flanges c of the enclosing side wall panels a. After treating the interior surface of the container as thus partly assembled with the cleansing acid, it is placed within the holding frame 20, in the manner shown in Figs. 2 and 3, with the opening g in the top wall panel d in communication with the opening 23 in the bottom wall 22 of the holding frame 20. The workman then applies the seams of solder s' over all the interior corner edges and interior corners defined between the enclosing side wall panels a and the top wall panel d, and the adjacent side edges of the enclosing side wall panels a. The soldering stand is so constructed as to give the workman free and convenient access to these corner edges and corners through the inverted bottom end of the partially assembled container as shown in Figs. 2 and 3. The holding frame 20 may be rotated from time to time by the workman to place the interior corner edges and corners of the partially assembled container in a manner most convenient for the performance of the soldering operation.

When this soldering operation has been completed, the bottom wall panel b is applied to the container side wall panels a, with the adjacent paired flanges c thereof secured together by rivets or eyelets f as shown more particularly in Figs. 4 and 5. After treating the corner edges and corners with acid, the container is placed in upright position within the holding frame 40 of stand B as shown in Figs. 4 and 5. The nozzle portion 75 of the hinging conduit section 70 is then swung into position to extend into the container through the opening g in the top panel d thereof so as to withdraw all fumes generated by the soldering operation therethrough and away from the head of the workman. The workman then applies the soldering seams s' to the interior corner edges and corners defined by the periphery of the bottom panel b, the holding frame 40 being rotated from time to time by the workman to most conveniently expose the areas to be soldered.

It is understood that various modes and methods of applying the principles of this invention may be employed, change being made in regard to details required by the particular application, and that changes and modifications in the form, construction and arrangement and combination of the several parts may be made and substituted for those herein shown and described without departing from the principles of this invention.

What is claimed is:

1. A soldering stand assembly including in combination, a fixed supporting structure, a holding frame adapted to contain and support the work piece to be soldered, means for rotatably mounting said holding frame on said supporting structure in inclined position to expose and make conveniently accessible the areas of the work piece to be soldered, said means including a tubular collar fixed to said supporting structure and arranged in inclined position, a tubular member fixed to the bottom wall of said holding frame and communicating with a fume exhaust opening in said holding frame, means for releasably and rotatably securing said tubular member to said fixed collar, and a suction pipe connected to said fixed collar through which the fumes generated during the soldering operation are exhausted.

2. A soldering stand assembly including in combination, a supporting framework, a holding frame having enclosing side walls and a bottom wall adapted to contain and support the work piece to be soldered, a fume exhaust box fixed to and supported upon said supporting framework, telescoping tubular members providing a bearing for rotatably supporting said holding frame on said exhaust box in inclined position to expose and make conveniently accessible the areas of the work piece to be soldered, said bottom wall of the holding frame having a fume exhaust opening therein communicating with the interior of said exhaust box through said tubular members.

3. A soldering stand assembly including in combination, a fixed supporting framework, a holding frame having enclosing side walls and a bottom wall adapted to contain and support the work piece to be soldered, a fume exhaust box fixed to and supported upon said supporting framework, telescoping tubular members providing a bearing for rotatably supporting said holding frame on said exhaust box, one of said tubular members being supported in inclined position on said exhaust box and said other tubular member being rotatable upon said first named tubular member and fixed to the bottom wall of said holding frame, said bottom wall of the holding frame having a fume exhaust opening therein communicating with the interior of said exhaust box through said tubular members.

GLENN H. NORQUIST.

REFERENCES CITED

The following references are of record in the file of this patent:

UNITED STATES PATENTS

| Number | Name | Date |
|---|---|---|
| 471,242 | Meritens | Mar. 22, 1892 |
| 840,894 | Allington | Jan. 8, 1907 |
| 1,398,096 | Frair | Nov. 22, 1921 |
| 1,585,490 | Hainsworth | May 18, 1926 |
| 1,934,808 | Tiptay | Nov. 14, 1933 |
| 2,082,374 | Angus | June 1, 1937 |
| 2,126,399 | Kohosoff | Aug. 9, 1938 |
| 2,194,101 | Spatta | Mar. 19, 1940 |
| 2,327,715 | Ingerson | Aug. 24, 1943 |
| 2,341,628 | Koweindl | Feb. 15, 1944 |
| 2,378,123 | Beck | June 12, 1945 |
| 2,421,469 | Smith | June 3, 1947 |

FOREIGN PATENTS

| Number | Country | Date |
|---|---|---|
| 5,676 | Great Britain | Mar. 8, 1907 |